US007865273B2

(12) United States Patent
Posselt et al.

(10) Patent No.: US 7,865,273 B2
(45) Date of Patent: Jan. 4, 2011

(54) METHOD FOR OPERATING A FUEL SUPPLY SYSTEM OF A MOTOR VEHICLE

(75) Inventors: Andreas Posselt, Muehlacker (DE); Thor Windbergs, Tamm (DE); Marko Lorenz, Grossbottwar (DE); Andreas Gutscher, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 449 days.

(21) Appl. No.: 12/002,045

(22) Filed: Dec. 13, 2007

(65) Prior Publication Data

US 2008/0161980 A1 Jul. 3, 2008

(30) Foreign Application Priority Data

Dec. 20, 2006 (DE) ...................... 10 2006 060 306

(51) Int. Cl.
*G05D 1/00* (2006.01)

(52) U.S. Cl. .............................. 701/1; 701/29; 701/30; 701/103; 701/104; 137/587; 123/520

(58) Field of Classification Search ..................... 701/1, 701/29, 30, 32, 36, 101, 103, 104; 137/587; 123/520
See application file for complete search history.

(56) References Cited

U.S. PATENT DOCUMENTS

2004/0178205 A1 * 9/2004 Balzer et al. ................ 220/563
2007/0286747 A1 * 12/2007 Nagase et al. ............ 417/410.1

FOREIGN PATENT DOCUMENTS

DE 199 58 393 6/2001
DE 103 35 732 2/2005

* cited by examiner

*Primary Examiner*—Gertrude Arthur Jeanglaud
(74) *Attorney, Agent, or Firm*—Kenyon & Kenyon LLP

(57) ABSTRACT

In a method for operating an internal combustion engine of a motor vehicle, a driver type is ascertained. A criterion for performing a diagnosis or a regeneration of a component of the fuel supply system is a function of the ascertained driver type.

20 Claims, 3 Drawing Sheets

METHOD FOR OPERATING A FUEL SUPPLY SYSTEM OF A MOTOR VEHICLE

BACKGROUND INFORMATION

It is known from German Patent Application No. DE 199 58 393 that information about the driver type may be derived from a time-averaged fuel consumption of an internal combustion engine. A transmission control system of the motor vehicle in which the internal combustion engine is installed is activated as a function of the ascertained driver type. German Patent Application No. DE 103 35 732 describes the establishment of a limit for an actuation rate of a gas pedal as a function of a previously ascertained driver type. When the limit is exceeded, more fuel is injected.

SUMMARY OF THE INVENTION

An object of the present invention is to provide a method of the above-named type via which the operating safety is improved and fuel consumption is reduced.

It is provided according to the present invention that the performance, in particular a criterion for performing regeneration, for example, of an active carbon filter which absorbs fuel vapor produced in a fuel container or for performing a diagnosis of a component of the fuel supply system, is a function of the ascertained driver type.

This is based on the following technology: In order to observe limiting values for hydrocarbon vapor emission, many motor vehicles have a fuel vapor retaining system. In such a retaining system, the fuel vapor produced in the fuel container is absorbed in an active carbon filter. However, the active carbon filter must be regenerated from time to time to restore its fuel absorbing capability. The active carbon filter may therefore be connected to an intake manifold of the internal combustion engine via a tank venting valve. If this valve is open, the partial vacuum in the intake manifold aspires fresh air through the active carbon container, entraining the fuel absorbed in the active carbon and taking it to combustion. The tank venting valve is activated observing the lambda factor, and the injected fuel quantity is adjusted accordingly.

The active carbon filter may, however, be regenerated only at certain operating points of the internal combustion engine at which sufficient partial vacuum exists in the intake manifold. In internal combustion engines having direct gasoline injection, regeneration may be performed only in (throttled) homogeneous operation, so that a changeover from stratified operation to homogeneous operation must be performed from time to time to fully regenerate the active carbon filter.

In the case of a calm and defensive driver type, an operating strategy of the fuel supply system is selected in which regeneration of the active carbon filter is performed only in a relatively extended steady-state operating state and, primarily, in an optimum operating state for regeneration of the active carbon filter. In contrast, in the case of an agitated and/or "sporty" driver, an operating strategy of the fuel supply system is selected in which frequent and brief activation of the regeneration of the active carbon filter is allowed to ensure appropriate absorbing capability of the active carbon filter in the other operating states. The criterion is insofar preferably a priority or a frequency. Other criteria for performing the regeneration are, however, also conceivable, for example, certain operating parameters (velocity, accuracy, point in time, temperature, etc.).

The performance of a diagnosis of a component of the fuel supply system or a criterion for this performance may also be a function of the ascertained driver type. This is based on the fact that the components and systems of the fuel supply system and of the internal combustion engine must be constantly checked for proper functioning to be able to ensure low-emission operation. The number of "trips" traveled and the number of diagnosis cycles performed must have a certain relationship to each other. Also in this case it is true that certain diagnoses are advantageously performed in certain operating states of the fuel supply system, i.e., of the internal combustion engine. Thanks to the method according to the present invention, an operating strategy of the fuel supply system may be selected for a calm and defensive driver in which a diagnosis is not initiated immediately or in each case, but, for example, in which the system waits for a steady-state operating state to increase the reliability of the diagnosis. At the same time, the priority of a diagnosis may be pushed "back" in such a case to possibly allow other time-critical functions to be given priority. In contrast, in the case of an agitated and "sporty" driver, an operating strategy is selected in which basically any diagnosis opportunity is quickly made use of to achieve the predefined diagnosis frequency. The preferred criteria are, also in this case, priority or frequency.

It is basically also conceivable that a way, in particular a characteristics curve, of determining a setpoint quantity of the fuel supply system is established or selected as a function of the ascertained driver type. The setpoint quantity is preferably a setpoint pressure or a gradient of the setpoint pressure. In the case of a calm, defensive driver, an operating strategy of the fuel supply system in which a rather low pressure level is set overall and pressure changes are effected relatively slowly and/or in a delayed manner is thus selected. Conversely, in the case of an agitated and/or "sporty" driver type, an operating strategy of the fuel supply system is selected in which the pressure level is increased, for example during acceleration phases, whereby a higher power output of the internal combustion engine may be achieved. A pressure change may also be implemented relatively quickly, i.e., spontaneously in such an operating strategy.

A preferred variant of the method according to the present invention provides that the ascertained driver type is linked to an identification means, in particular a vehicle key, a wireless key card, or a certain seat setting, and prior to or during operation of the internal combustion engine the driver type is identified on the basis of the identification means and the appropriate operating strategy is selected. This makes it possible to set the optimum operating strategy of the fuel supply system already from the start of the internal combustion engine, which further improves the emission and consumption characteristics of the internal combustion engine. It is understood that it is always possible to check whether the current driver type actually matches the driver type identified using the identification means, and in the event of a change in the driver type the new driver type is re-stored or re-linked to the identification means.

In the method according to the present invention, a selection may be made from a plurality of different fixedly set driver types and corresponding operating strategies. The driver types may include: consumption-oriented driver, torque-oriented driver, calm driver, agitated driver. However, other driver types are also conceivable.

The present invention makes it possible to make optimum use of possible regeneration and diagnosis phases, which is advantageous in particular in the case of agitated drivers because the necessary regeneration time and the necessary diagnosis frequency are achieved even with such drivers thanks to the present invention. The diagnosis reliability may also be improved. In addition, a reduction in consumption may be achieved with a defensive driver and a gain in torque may be achieved with a rather sporty driver.

DETAILED DESCRIPTION

Figure 1:
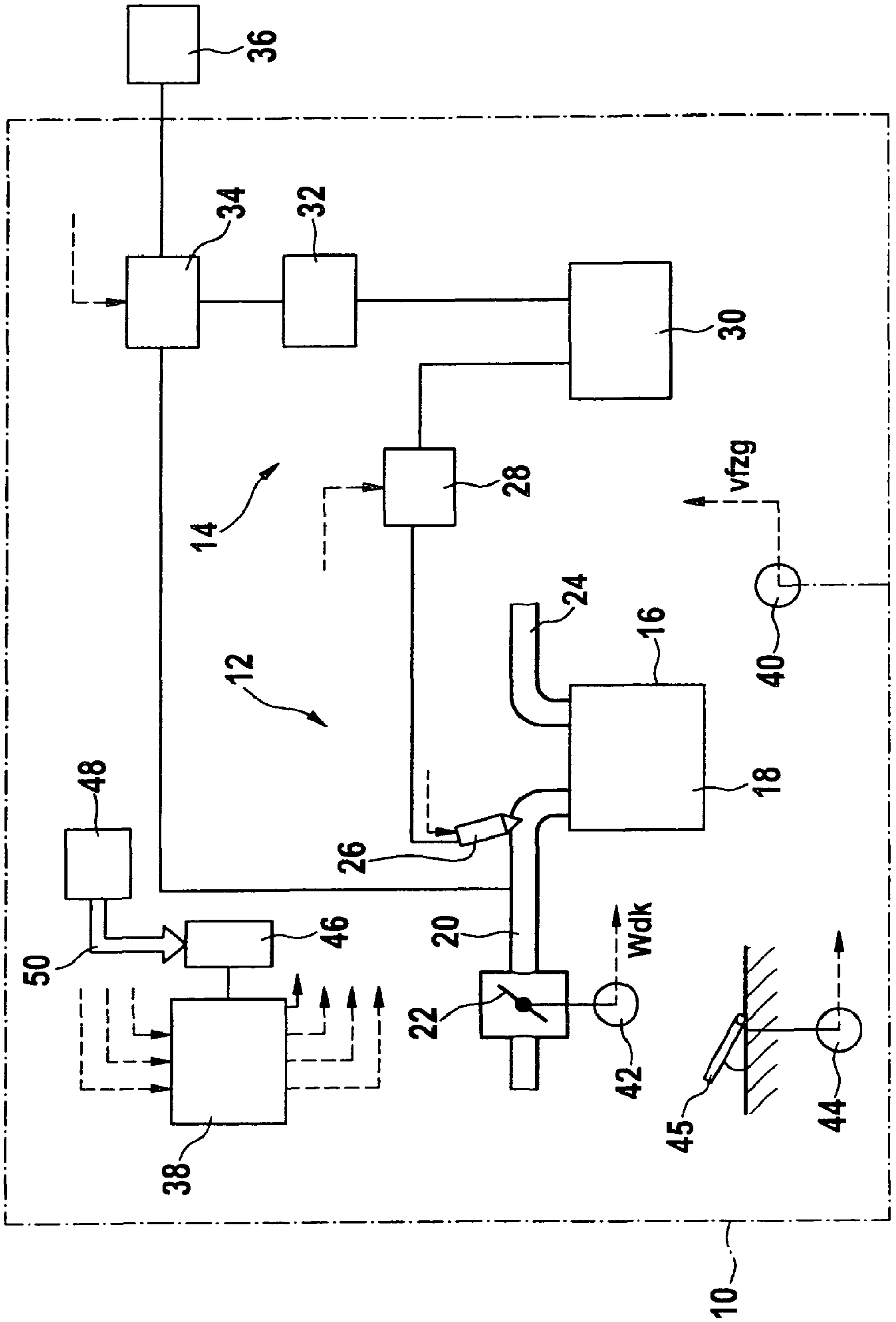
FIG. 1 shows a schematic depiction of a motor vehicle having an internal combustion engine and a fuel supply system.

A motor vehicle is labeled with reference numeral 10 in FIG. 1. It is indicated in FIG. 1 only schematically by a box delimited by a dash-dotted line. Motor vehicle 10 is driven by an internal combustion engine 12, which is in turn supplied by a fuel supply system 14.

Internal combustion engine 12 includes a plurality of cylinders, only one of which is labeled with reference numeral 16 in FIG. 1 for the sake of clarity. Cylinder 16 includes a combustion chamber 18, to which combustion air is supplied via an intake manifold 20, in which a throttle valve 22 is situated. Combustion gases are removed from combustion chamber 18 via an exhaust pipe 24.

Fuel supply system 14 has a fuel injector 26, which injects fuel (gasoline) into intake manifold 20. The functions elucidated below, however, may be similarly implemented also in internal combustion engines having direct gasoline injection or in diesel engines. Fuel injector 26 is supplied by an electrical fuel pump 28, which in turn aspires fuel from a fuel container 30. Fuel container 30 is in turn connected to an active carbon filter 32, which may be connected either to an environment 36 or to intake manifold 20 via a tank venting valve 34.

The operation of internal combustion engine 12 and fuel supply system 14 is controlled and regulated by control and regulating unit 38, which controls, for example, throttle valve 22, fuel injector 26, electrical fuel pump 28, and tank venting valve 34. Fuel injector 26 may be supplied with fuel at varying pressure levels by activating electrical fuel pump 28.

Control and regulating unit 38 receives signals from different sensors, for example, a sensor 40, which ascertains an instantaneous velocity vfzg of motor vehicle 10, a sensor 42, which detects an instantaneous position wdk of throttle valve 22, and a sensor 44, which detects an instantaneous position wped of an accelerator pedal 45. Furthermore, control and regulating unit 38 is connected to a receiver 46, which reads information of identification means 48 (arrow 50). Identification means 48 may be an ignition key or a key card via which control and regulating unit 38 may identify a certain driver of motor vehicle 10.

Figure 2:
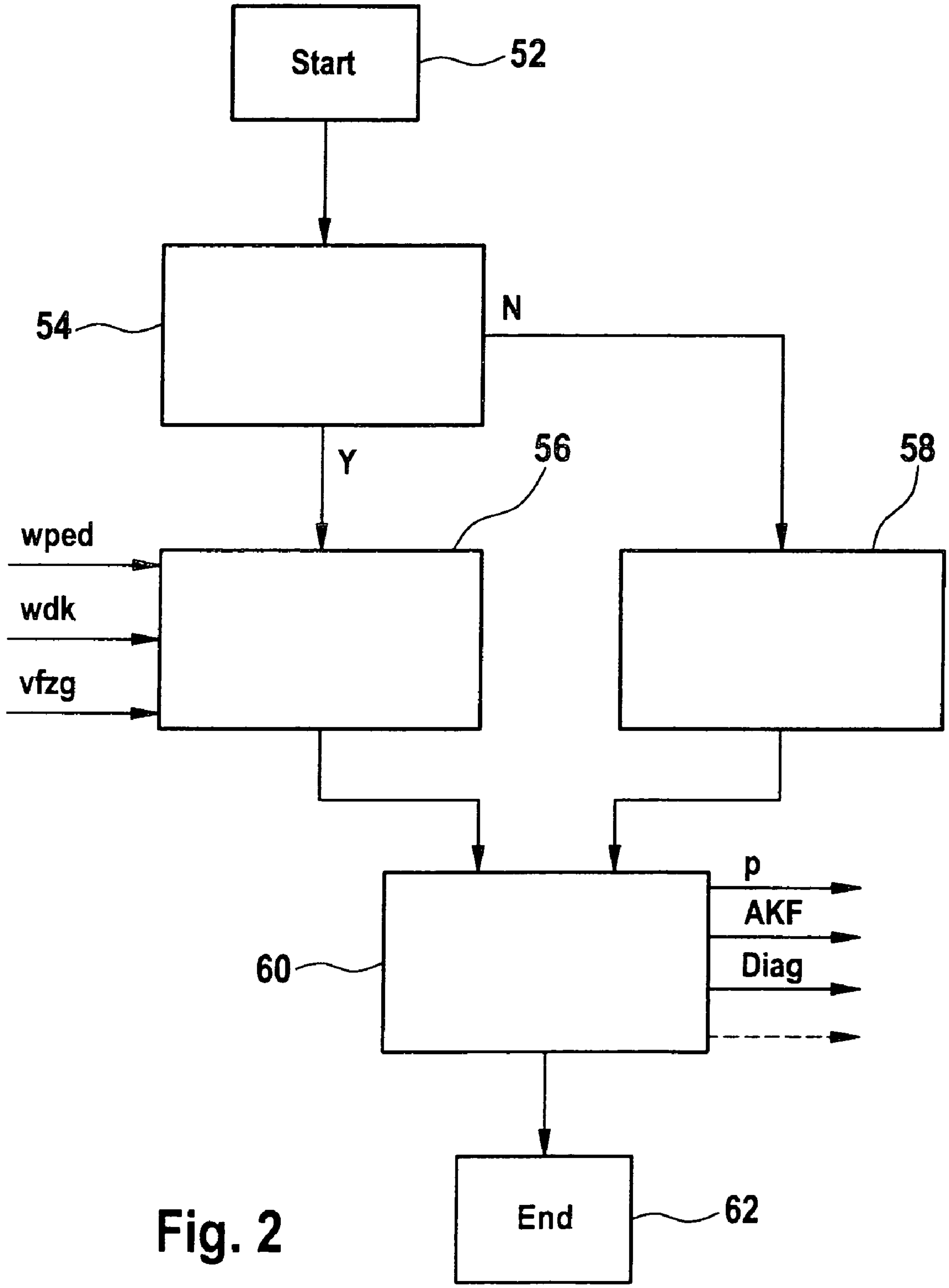
FIG. 2 shows a flow chart of a method for operating the internal combustion engine, i.e., the fuel supply system of FIG. 1.

In motor vehicle 10 of FIG. 1, an operating strategy of fuel supply system 14 of internal combustion engine 12 is a function of a previously ascertained driver type. The driver type is ascertained up to the minute on the basis of current operating parameters of motor vehicle 10 and internal combustion engine 12, or it may be ascertained using identification means 48 if a certain driver type was previously linked thereto. This is now elucidated with reference to FIG. 2:

After a start in 52, a query is performed in 54 to determine whether driver type recognition is required for ascertaining the current driver type. If the answer in 54 is yes, driver type recognition is performed in 56. For this purpose, typical operating parameters of internal combustion engine 12 are used, for example, a mean absolute value of position wped of accelerator pedal 45, a gradient of position wped, a mean position wdk of throttle valve 22, a gradient of this position wdk, a mean gradient of the vehicle velocity vfzg, etc. The current driver may be assigned to a certain driver type in 56 by comparison with typical behavior patterns. The driver type may include, for example:

consumption-oriented driver, torque-oriented driver, calm driver, agitated driver.

If the answer in 54 is no, the driver type is ascertained in 58 using identification means 48. This presupposes that the driver type was recognized in a previous drive on the basis of the above-mentioned operating parameters of motor vehicle 10 and of internal combustion engine 12 and linked to specific identification means 48. The corresponding driver type may then be identified on the basis of identification means 48.

Depending on the driver type recognized in 56 or ascertained in 58, an appropriate operating strategy for fuel supply system 14 is now selected in 60. The method is terminated in 62.

Figure 3:
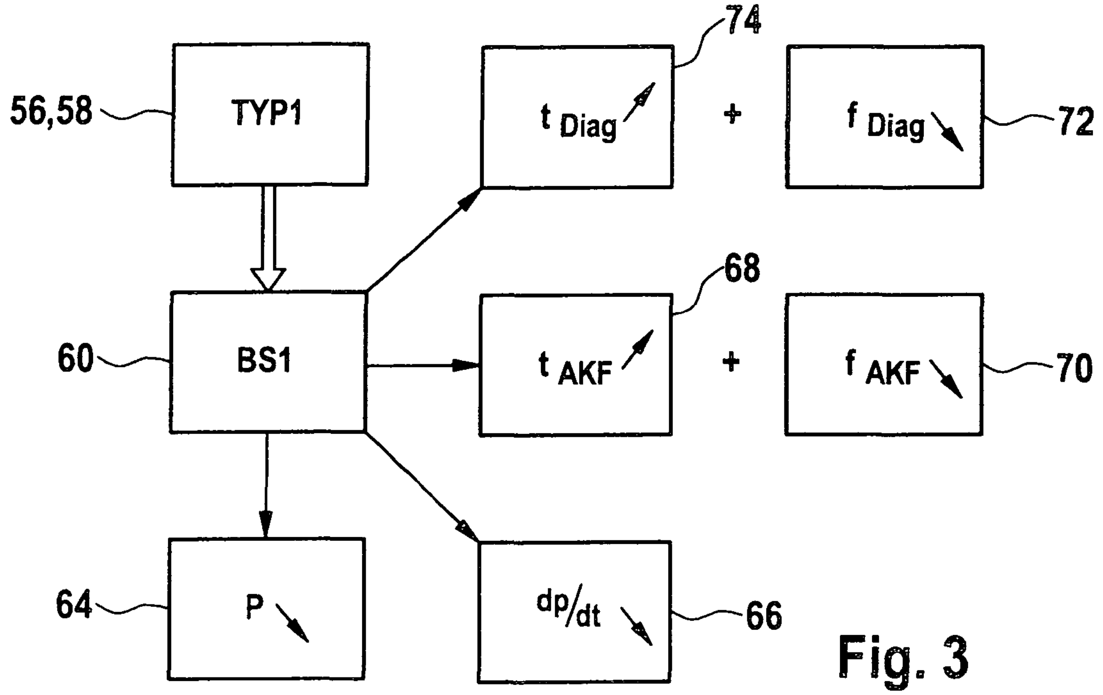
FIG. 3 is a schematic depiction for elucidating a first operating strategy of the fuel supply system of FIG. 1, which is associated with a first driver type.
Figure 4:
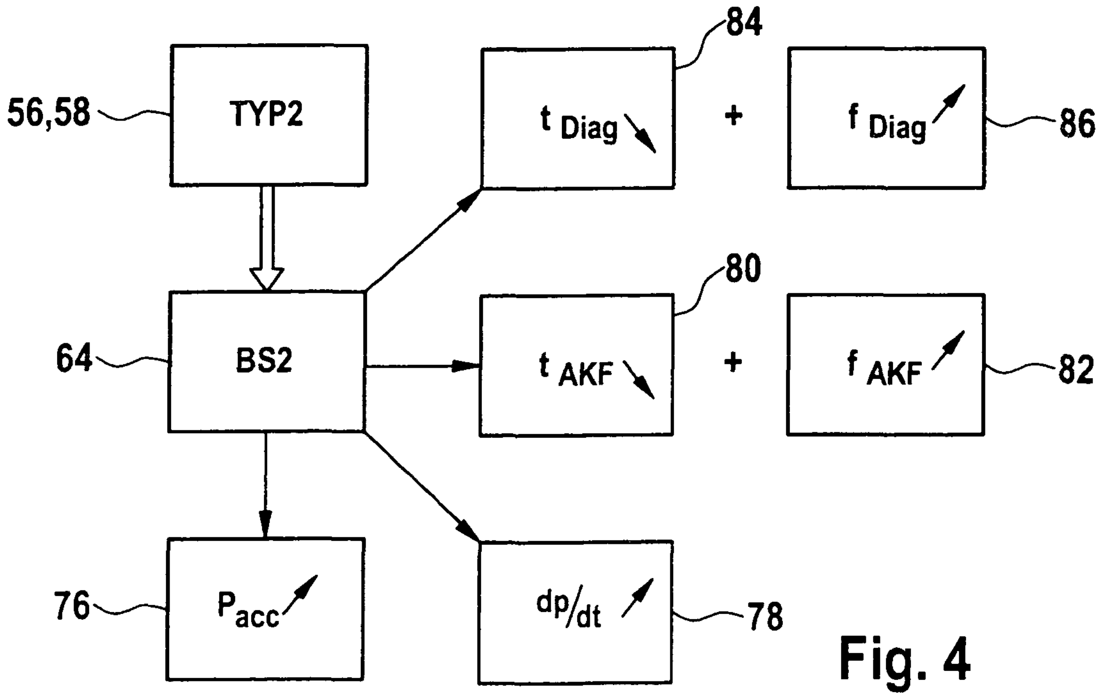
FIG. 4 is a depiction similar to FIG. 3 for a second operating strategy associated with a second driver type.

The meaning of the different driver types and the corresponding operating strategies of fuel supply system 14 are now elucidated with reference to FIGS. 3 and 4. A driver type TYP1 is recognized in FIG. 3. It is associated with an operating strategy BS1 of fuel supply system 14. Driver type TYP1 corresponds in the specific embodiment described in FIG. 3 to a generally calm and defensive driver. The corresponding operating strategy BS1 of fuel supply system 14 means that electrical fuel pump 28 is activated in 64 in such a way that an injection pressure p is reduced overall in a controlled manner. Of course, this does not change the fact that the pressure is adjusted to a variable setpoint pressure as a function of other operating parameters of internal combustion engine 12 and of motor vehicle 10. In operating strategy BS1, the setpoint pressure level is thus reduced overall. At the same time, operating strategy BS1 means that a change dp/dt in the pressure is implemented more slowly or in a delayed manner (block 66). Although torque is thereby lost, fuel consumption is also reduced.

In contrast, duration $t_{AKF}$ of those phases in which tank venting valve 34 connects active carbon filter 32 to intake manifold 20 is prolonged in 68 and frequency $f_{AKF}$ of such phases is reduced (block 70), or, in other words, in operating strategy BS1 regeneration of active carbon filter 32 is enabled later and only when a relatively steady-state operating phase of internal combustion engine 12 has been reliably achieved and the likelihood of a longer constant drive is therefore relatively high.

With regard to the performance of diagnoses of fuel supply system 14, operating strategy BS1 means that their frequency $f_{DIAG}$ is reduced, while their duration $t_{DIAG}$ is increased, so that relatively high diagnosis reliability is obtained (blocks 72 and 74). The priority of a diagnosis also may be pushed "back" in operating strategy BS1 to possibly allow other time-critical functions to be given priority.

If, however, another driver type is recognized in 56 or 58, for example, a TYP2 driver type, an operating strategy BS2 of fuel supply system 14 is selected for this driver type TYP2 according to FIG. 4. It is assumed here that driver type TYP2 is an agitated and "sporty" driver. In operating strategy BS2 of fuel supply system 14, fuel pressure $P_{acc}$ is increased when the driver requests an increase in torque, for example when accelerating motor vehicle 10, taking into account consumption disadvantages. A change dp/dt in the pressure is also adjusted to a changed setpoint value quickly and immediately via an appropriate spontaneous and rapid activation of electrical fuel pump 28 (block 78).

For regenerating tank venting valve 34, very short constant phases are used to ensure a high rinsing rate of active carbon filter 32. This means that duration $t_{AKF}$ of the rinsing phase is reduced; however, the corresponding frequency $f_{AKF}$ is relatively high (blocks 80 and 82 in FIG. 4). Similarly, each diagnosis opportunity is quickly made use of to achieve the necessary diagnosis frequency.

Time windows $t_{DIAG}$, in which a diagnosis may be performed, are therefore selected in 84 to be small and the allowed frequency $f_{DIAG}$ to be relatively high (blocks 84 and 86).

It is apparent that, when using the above-described method, it is possible to characterize the driver type on the basis of typical driving behavior patterns, for example, accelerator pedal position wped, pedal gradient dwped/dt, frequency of load change, etc., and to implement a customized operating strategy of fuel supply system 14. Fuel consumption and torque may also be adjusted to the individual driver type, the utilization of possible regeneration phases of active carbon filter 32 may be optimized, and also the utilization of possible diagnosis phases may be optimized and the diagnosis reliability increased.

What is claimed is:

1. A method for operating a fuel supply system of a motor vehicle comprising:

detecting a driving behavior of a driver of the motor vehicle via at least one control input of the driver;

ascertaining a driver type as a function of the driving behavior; and performing one of a diagnosis and a regeneration of a component of the fuel supply system as a function of the ascertained driver type.

2. The method according to claim 1, further comprising one of establishing and selecting a criterion for a performance as a function of the ascertained driver type.

3. The method according to claim 2, wherein the criterion includes one of a priority and a frequency.

4. The method according to claim 1, wherein the component includes an active carbon filter which absorbs fuel vapor produced in a fuel container.

5. The method according to claim 1, further comprising:

linking the ascertained driver type to an identification means, including one of a vehicle key and a certain seat setting;

prior to or during operation of an internal combustion engine of the motor vehicle, identifying the driver type on the basis of the identification means; and operating the fuel supply system as a function thereof.

6. The method according to claim 1, wherein a selection is made from a plurality of different established driver types and corresponding driver-specific dependencies, the driver types including at least one of consumption-oriented driver, torque-oriented driver, calm driver, and agitated driver.

7. The method according to claim 6, further comprising reducing a priority for a consumption-oriented or calm driver and increasing a priority for a torque-oriented or agitated driver.

8. A control/regulating unit for an internal combustion engine, the unit operating a fuel supply system of a motor vehicle, the unit comprising:

a computer processor configured to:

detect a driving behavior of a driver of the motor vehicle via at least one control input of the driver;

ascertain a driver type as a function of the driving behavior; and perform one of a diagnosis and a regeneration of a component of the fuel supply system as a function of the ascertained driver type.

9. The control/regulating unit according to claim 8, wherein the computer processor is configured to:

link the ascertained driver type to an identification means, including one of a vehicle key and a certain seat setting; and prior to or during operation of an internal combustion engine of the motor vehicle, identify the driver type on the basis of the identification means; and operate the fuel supply system as a function thereof.

10. The control/regulating unit according to claim 8, wherein a selection is made from a plurality of different established driver types and corresponding driver-specific dependencies, the driver types including at least one of consumption-oriented driver, torque-oriented driver, calm driver, and agitated driver.

11. The control/regulating unit according to claim 8, wherein the processor is configured to one of establish and select a criterion for a performance as a function of the ascertained driver type.

12. The control/regulating unit according to claim 11, wherein the criterion includes one of a priority and a frequency.

13. The control/regulating unit according to claim 8, wherein the component includes an active carbon filter which absorbs fuel vapor produced in a fuel container.

14. The control/regulating unit according to claim 8, wherein the processor is configured to reduce a priority for a consumption-oriented or calm driver and increasing a priority for a torque-oriented or agitated driver.

15. A computer-readable medium containing a computer program which when executed by a processor performs the following method for operating a fuel supply system of a motor vehicle:

detecting a driving behavior of a driver of the motor vehicle via at least one control input of the driver;

ascertaining a driver type as a function of the driving behavior; and performing one of a diagnosis and a regeneration of a component of the fuel supply system as a function of the ascertained driver type.

16. The computer-readable medium according to claim 15, wherein the medium is for a control/regulating unit of an internal combustion engine.

17. The computer-readable medium according to claim 15, wherein the method further comprises:

linking the ascertained driver type to an identification means, including one of a vehicle key and a certain seat setting;

prior to or during operation of an internal combustion engine of the motor vehicle, identifying the driver type on the basis of the identification means; and operating the fuel supply system as a function thereof.

18. The computer-readable medium according to claim 15, wherein a selection is made from a plurality of different established driver types and corresponding driver-specific dependencies, the driver types including at least one of consumption-oriented driver, torque-oriented driver, calm driver, and agitated driver.

19. The computer-readable medium according to claim 15, wherein the method further comprises reducing a priority for a consumption-oriented or calm driver and increasing a priority for a torque-oriented or agitated driver.

20. The computer-readable medium according to claim 15, wherein the method further comprises one of establishing and selecting a criterion for a performance as a function of the ascertained driver type.

* * * * *